United States Patent

[11] 3,586,862

| [72] | Inventor | George J. Topol |
| | | Reston, Va. |
| [21] | Appl. No. | 857,921 |
| [22] | Filed | Sept. 15, 1969 |
| [45] | Patented | June 22, 1971 |
| [73] | Assignee | Keene Corporation |
| | | New York, N.Y. |

[54] APPARATUS FOR CONTINUOUS DETECTION AND MEASUREMENT OF SUSPENDED SOLIDS IN LIQUIDS
14 Claims, 4 Drawing Figs.

[52] U.S. Cl. .................................................. 250/218,
356/208
[51] Int. Cl. .................................................. G01n 21/26
[50] Field of Search .......................................... 250/218,
227; 356/208, 180—183

[56] References Cited
UNITED STATES PATENTS
2,654,845 10/1953 Presenz ..................... 250/210
3,263,553 8/1966 Baruch ..................... 250/218
3,487,069 12/1969 Maselli ..................... 250/218

*Primary Examiner*—Walter Stolwein
*Assistant Examiner*—M. Abramson
*Attorney*—Jeffers and Young ABSTRACT: The invention pertains to a device for being inserted in a liquid and being operable to measure or analyze the suspended solids in the liquid, also referred to as turbidity of the liquid. The device operates by directing light into the liquid and measuring the amount of the light reflected by the solids in the liquid with a photocell. A second photocell more remote from the source of light than the first photocell can be employed to compensate for ambient light, and for light reflected from articles remote from the light source, or light which is reflected from the side of a vessel in which the device is located. A still further photocell may be employed which receives light from the light source through a relatively narrow body of the liquid being analyzed and can be employed as a calibrating standard.

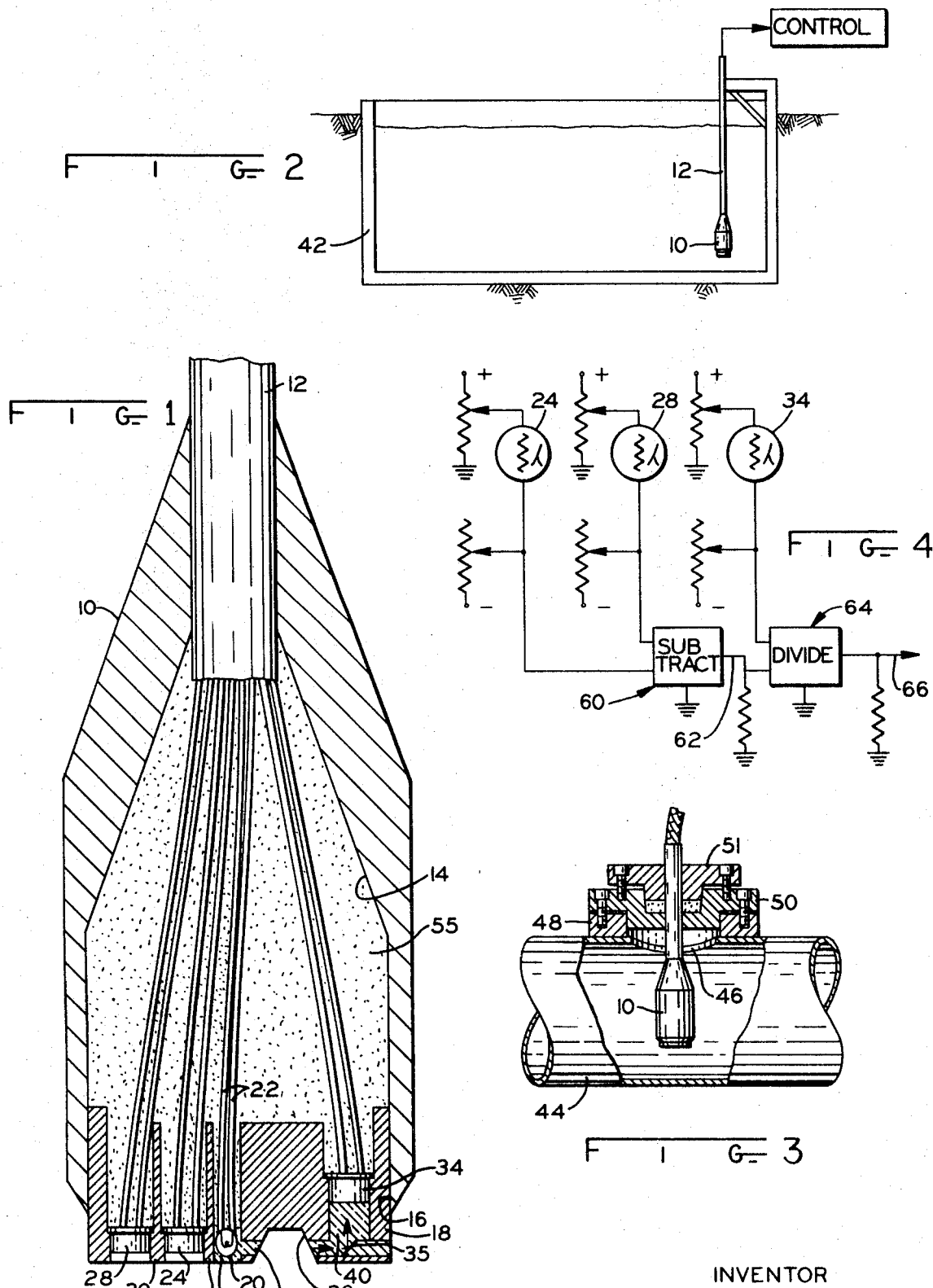

3,586,862

APPARATUS FOR CONTINUOUS DETECTION AND MEASUREMENT OF SUSPENDED SOLIDS IN LIQUIDS

BACKGROUND OF THE INVENTION

In many industrial processes it is of importance to be able to measure the concentration of solids suspended in a liquid. Quite often it is important to monitor the liquid with respect to the concentration of suspended solids continuously and to be able to take instantaneous readings, or effect instantaneous control operations.

The present invention is concerned with an arrangement for making such measurements by employing a light source, the light from which is directed into the liquid with the amount of suspended solids in the liquid being indicated by the reflection of light from the liquid. The general principle of measuring the concentration of solids suspended in a liquid, or for measuring liquid turbidity by means of light transmission or light scattering is well known but, heretofore, the method has been generally applicable and reliable only for relatively low concentrations of solids in the liquid.

Heretofore, measurements have been made by passing light directly through liquid to a photocell, or by passing the light into the liquid and measuring the amount of light scattered in the lateral direction by the solids in the liquid, or by directing the light into the liquid and measuring the light reflected backwardly by the solids in the liquid.

Each of these arrangements has been found to have limitations, particularly when the concentration of solids exceeds a relatively low level. With lower concentration of solids, any of the foregoing measure arrangements may provide for a relatively linear photocell response thus giving a reliable and readily usable signal. However, as the concentration of the suspended solids increases, the photocell response tends to become nonlinear and the signal from the photocell becomes less reliable.

With the arrangement referred to where the photocell measures light scattered in the lateral direction, there is a point where an increase in concentration of the solids in the liquid causes levelling off of the photocell output, due to reduced light transmission through the liquid, and, thereafter, a decrease in the photocell output. Such an arrangement makes no distinction between certain low ranges and certain high ranges of solids concentration in the liquid and, thus, is not reliable for general use.

It will be evident that where light passes completely through a body of liquid, the color of the liquid will influence the photocell output and that, furthermore, at extremely high concentrations the photocell output becomes unreliably small.

An arrangement has been attempted wherein the light source and photocell are arranged at the same side of a body of liquid and the light passed through a transparent window into the liquid and is reflected back through the window to the photocell. This makes for a relatively short light path and higher concentrations of solids can be reliably measured. To obtain accurate measurements, however, requires that the photocell be extremely small and there is a limit to the reduction in size of the cell because larger solid particles found in many sludges and other liquids carrying high concentrations of suspended matter can interfere with the supply of light to the photocell and lead to inaccurate readings.

Where the liquid is in continuous flow, it might be possible to avoid interference due to larger particles, but wherever the liquid is in a stationary condition, as in a tank, or is moving relatively slowly, the photocell can only be reduced in size a certain amount and still provide for reliable results.

Where the light source and photocell are placed in a close side-by-side relation and the photocell is illuminated by light reflected back toward the photocell, the liquid can be visualized as made up of parallel layers, each reflecting light back toward the photocell. The layer nearest the light source is the most brilliantly illuminated, while layers successively further from the light source receive lesser amounts of light, with the light decreasing according to the square of the distance of the respective layer from the light source.

The suspended solid particles nearest the light source and photocell thus predominate in affecting the photocell, while the more distinct particles are only dimly illuminated and are relatively unimportant with regard to the effect on the photocell.

With an arrangement wherein the light source and photocell are in close side-by-side relation, the light path from the light source to the photocell is materially shortened and the photocell can be substantially reduced in size, while still receiving adequate light to provide for a reliable response. It has been found possible to measure relatively high solids concentration with good linearity of photocell response and, therefore, no reversal of photocell output.

Certain limitations are found to be present in an arrangement of the nature referred to immediately above, however, and this comes about because the photocell and light source must be separated from the liquid being monitored by a transparent sealing barrier, such as glass, and this imposes a limitation on the amount that the distance between the light source and the particles can be reduced and which, in turn, effects the linearity of the photocell response.

Still further, some of the light directed toward the photocell can be reflected from the surface of the sealing barrier, or glass wall, disposed between the liquid and the lamp and photocell. This reflected light will create a certain minimum background signal that can produce inaccurate results in the low concentration range.

Still further, in certain instances, particularly with relatively clear liquids, the light can be reflected from the opposite wall of the liquid container and which sort of reflection would also introduce serious inaccuracies in readings, especially those taken in the low concentration range.

The customary light source in the form of a light bulb is subject to variation in light output due to variations of supply voltage and also to other aging characteristics of the light bulb which will introduce inaccuracies in the signal output unless the calibration of the instrument is changed.

With the foregoing in mind, the present invention has as a primary objective, the provision of a suspended solids analyzer which will overcome all of the drawbacks referred to above.

Another object of this invention is the provision of a suspended solids analyzer, which can be placed in stationary bodies of liquid as well as flowing bodies of liquid and will provide for accurate measurement of the solids concentration in the liquid in all cases.

A still further object of this invention is the provision of a suspended solids analyzer of the nature referred to having incorporated therein compensating elements which compensate for liquid color and aging of the light bulb and variations in voltage and other factors which would tend to produce unreliable measurements.

A still further object of this invention is the provision of a suspended solids analyzer in which the measuring portion is in the form of a unitary head adapted for being submerged directly in the liquid being measured.

SUMMARY OF THE INVENTION

The objects referred to above, as well as other objects of the present invention are achieved by constructing a detector which is fluidtight and is, thus, adapted for being immersed directly in the liquid to be measured or monitored.

A supply cable is connected to one end of the head and mounted in the other end is a light source. The light source is sealed in the head closely adjacent the end by the transparent sealing material. Adjacent the light source in the head is a principal measuring photocell, also sealed in the head, and adapted for receiving light reflected from the particles in the liquid which are illuminated by the light source.

Spaced in the head a further distance from the light source than the first mentioned photocell is a second photocell which is also illuminated by light from the lamp which is reflected back toward the head. The second photocell is such a distance from the lamp, however, that it only receives a small fraction of its light from the particles nearest the head and, instead, receives light reflected by the backwall of the container for the liquid and from any ambient light source and from particles remote from the light source. The signal from the second photocell is subtracted from the signal developed by the first photocell and in this manner compensates for factors effecting the output of the first photocell, other than light reflected thereto from the nearest solid particles in the liquid.

Still a third photocell is carried in the head and is illuminated by light from the light source passing directly through a body of the liquid being measured. This third photocell is a further compensating photocell and the output therefrom is used to divide the difference between the outputs of the first mentioned photocell and the output of the second mentioned compensating photocell. The third photocell, in this manner, compensates for variations in the voltage supply to the light source, and for aging of the light source and, furthermore, compensates for color of the liquid and for accumulations on the transparent sealing material which covers the photocells and light source and which would modify the supply of light to the primary photocell.

The exact nature of the present invention will become more clearly apparent upon reference to the following detailed specification taken in connection with the accompanying drawing in which:

FIG. 1 is a somewhat schematic vertical sectional view through a measuring head for a suspended solids analyzer according to the present invention;

FIG. 2 schematically shows a head according to the present invention suspended in a tank or channel through which liquid moves;

FIG. 3 is a schematic view showing how the head could be installed in a pipe through which the liquid to be monitored also flows; and FIG. 4 is a schematic representation of a circuit wherein the signals from the photocells mounted in the head are combined to provide for a compensated output signal.

DETAILED DESCRIPTION

Referring to the drawings somewhat more in detail, in FIG. 1 the measuring head for being suspended directly in the liquid to be monitored is illustrated. The head comprises a body 10, of metal or plastic, which has leading from one end thereof a conduit 12 which supports the head and through which wires pass to the light source and the photocells in the head. Conduit 12 may be in the form of a rigid conduit, either metal or plastic, or it can be a flexible type conduit, if so desired.

The body 10 of the head has a cavity 14 therein through which the aforementioned wires pass to the light source and photocells. The end of body 10, opposite conduit 12, has a preferably cylindrical opening 16 in which a cylindrical support member 18 is mounted and which support member has axial bores for receiving the lamp forming the light source and the several photocells.

In about the center of support member 18, there is positioned light bulb 20 connected by wires 22 leading through conduit 12 to a source of energizing voltage. Closely adjacent light bulb 20 is a photocell 24 which is the primary measuring photocell and which detects the lights scattered or reflected backwardly toward photocell 24 from the liquid immediately adjacent the bulb 20 and photocell 24. The support member 18 includes an opaque partition member 26 interposed between light bulb 20 and photocell 24 so that no light can reach the photocell from light bulb 20 except that which is scattered, or reflected, by particles in the liquid.

On the opposite side of photocell 24 from the light bulb 20 is a second photocell 28, with an opaque partition 30 separating photocells 24 and 28. Photocell 28, which can be referred to as a compensating photocell, receives a certain amount of light reflected or scattered by the particles in the liquid, but due to its relative great distance from light bulb 20, as compared to the distance of photocell 24 from light bulb 20, receives only a small fraction of its light by reflection from the particles. Rather, the light from light bulb 20 which reflects from the opposite wall of the liquid container, or ambient light, provides the principal illumination for photocell 28.

About the same amount of extraneous light will fall on photocell 24 so that by subtracting the output of photocell 28 from the output of photocell 24, any light directed toward photocell 24 other than light reflected by the particles is compensated for. For example, ambient light, such as daylight, as well as light reflected from the wall of the liquid container, affects both of cells 24 and 28 equally and is, thus, compensated for in the manner referred to above.

Light bulb 20 and both of photocells 24 and 28 are sealed liquidtight in support member 18 by light transmitting sealing material, indicated at 32. This material is preferably transparent.

Support member 18 may carry a still further photocell at 34 positioned relatively remote from the end of the head which carries photocells 24 and 28. Photocell 34 thus receives substantially no illumination reflected or scattered by the particles in the liquid and substantially no ambient light and no illumination reflected from the wall of the liquid container. Rather, the measuring head is provided with a recess in the form of a groove 36 and leading from one wall of groove 36 to lamp 20 is a body 38 of light transmitting, preferably transparent, material, which may be and preferably is, the same material that seals light bulb 20 and photocells 24 and 28 in the head.

From the opposite sidewall of groove 36, another body 40 of the light transmitting sealing material leads to photocell 34 and seals the photocell in the support member 18 and, likewise, transmits light to photocell 34. A reflector, at 35, may be employed to provide for effective supply of light to photocell 34.

With the described arrangement of photocell 34, substantially all the illumination supplied thereto comes from light bulb 20 and across groove 37, thus passing directly through a body of the liquid being monitored. This substantially direct illumination of photocell 34, by the light bulb, provides a signal which, when used to divide the signal from the output of photocell 24 minus the signal from the output of photocell 28, compensates for changes in the light output from light bulb 20, which might come about due to aging of the light bulb or from variation of the voltage supplied thereto, or from a film on the surface of the sealing material.

Furthermore, photocell 34 provides for compensation where the liquid has a dark color due to substances dissolved therein, rather than solids suspended therein. Such darkening of the liquid will, of course, decrease the amount of light scattered to the measuring photocell 24 and by employing the output from photocell 34 in the manner referred to, the darkness of the liquid is compensated for.

Still further, as mentioned, if the surface of the transparent sealing material becomes soiled by the deposit of a film thereon, this will not only reduce the light falling on photocells 24 and 28, but it will also reduce the amount of light falling on photocell 34 so that this effect also is compensated for by the provision of photocell 34.

The measuring head 10, with its conduit 12, can be suspended directly in a tank or channel 42 for the liquid to be monitored as shown in FIG. 2, or it can be arranged to be inserted in a pipe carrying the liquid, as shown in FIG. 3. In FIG. 3, pipe 44 is provided with an opening 46 large enough to receive the head 10. A rim 48 upstands about opening 46 and is adapted for receiving head 50 which has a radial flange 51 thereon engaging rim 48.

Returning to FIG. 1, the cavity 14 in body 10 is preferably filled with a potting material 55 so that the entire head is protected against the entrance of liquid and is heavy enough that it will sink readily in liquids in which it is immersed while, furthermore, the potting material supports the body 10 and the support member 18 sealingly mounted in the open end thereof against fracturing due to rough handling, or the like.

FIG. 4 illustrates diagrammatically how the photocells 24, 28 and 34 can be connected in circuit. In FIG. 4, each of the photocells is connected in circuit between plus and minus sources through respective potentiometers so as to provide output signals in the form of respective voltages.

The output signal from the primary measuring photocell or scatter photocell 24 is supplied to one input of a subtracting circuit 60, the other input of which is derived from compensating photocell 28. Circuit 60 subtracts the signal derived from photocell 28 from that of photocell 24 and supplies the resulting difference to an output wire 62. Output wire 62 supplies one of the inputs to a dividing circuit 64, the other input of which is derived from photocell 34, which might be referred to as a transmitting cell. In circuit 64, the input derived from circuit 60 and output 62 thereof is divided by the signal derived from photocell 34 so that a compensating signal is supplied to wire 66 leading from the output of circuit 64. The signal or wire 66 may be amplified so as to operate a relay which, in turn, can control valves or the like as may be necessary to maintain or adjust the solids concentration of the liquid being monitored. No specific circuits are shown for the circuitry, generally designated 60 and 64, because conventional circuits are utilized for this purpose.

Where the term "light" is employed in the foregoing specification and appended claims, it will be understood that the term refers to any radiation within the light spectrum that can be created by the electrical supply to the measuring head and detected by the cells in the head; thus, infrared radiation and ultraviolet radiation are included within the term, as well as visible radiation. The infrared radiation and visible radiation are more important than the ultraviolet radiation, because they are more easily arrived at and more easily detected.

It will be apparent that modifications may be made within the purview of the appended claims.

What I claim is:

1. A device for continuous detection and measurement of suspended solids in liquids and comprising: a body adapted for being immersed in the liquid and having a region which presents a substantially flat surface to the exterior of the body, a source of radiation in the said region of said body, a first photocell in said region of said body closely adjacent said source, a second photocell in said region of said body substantially farther away from said source than said first photocell, said source and photocells being located near said surface, opaque partition means in said region of said body between said source and said photocells preventing any direct illumination of said photocells by said source, radiation transmitting sealing material sealing said source and photocells in said region of said body and forming at least a part of said surface, said sealing material permitting radiation from said source to pass outwardly from said region of said body and permitting radiation to pass inwardly in said region of said body to said photocells, conduit means connected to said body, and conductors leading through said conduit means and body and electrically connected to said source and photocells.

2. A device according to claim 1, in which said region of the body has an outwardly opening recess therein for receiving liquid, said recess having a first sidewall adjacent said source and having a second sidewall opposed to said first sidewall, a third photocell in said body shielded from radiation entering said region of the body from outside the body, and aligned radiation transmitting means leading from said source to said first sidewall of said recess and from said second sidewall of said recess to said third photocell for illumination of said third photocell by radiation transmitted directly from said source along said radiation transmitting means and through the liquid in said recess.

3. A device according to claim 2, in which said recess is in the form of a groove extending completely across said body.

4. A device according to claim 3, in which said first and second photocells are on the same side of said groove as said source.

5. A device according to claim 1, in which said region of said body is an end thereof and said conduit means is connected to and extends from the opposite end of said body.

6. A device according to claim 5, in which said body is formed with a cavity, said cavity being filled with a potting material to impart strength and weight to said body.

7. A device according to claim 6, in which said body is generally cylindrical in longitudinal cross section and is open at said one end thereof, a cylindrical support member sealingly mounted in said open end of said body, said support member having respective axial bores therein receiving said source and photocells, said radiation transmitting sealing material sealingly filling the outer ends of said bores.

8. A device according to claim 4, in which said body is generally cylindrical in longitudinal cross section and is open at said one end thereof, a cylindrical support member sealingly mounted in said open end of said body, said support member having respective axial bores therein opening outwardly from said body and receiving said source and said first and second photocells, said radiation transmitting sealing material sealingly filling the outer ends of said bores, said groove being formed in said support member receiving said third photocell, holes in said support member, a further bore in said support member receiving said third photocell, holes in said support member leading from the bores for said third photocell and source to said opposed sidewalls of said groove, and the same said radiation transmitting material filling said holes and sealingly filling said further bore between said third photocell and the respective said hole.

9. A device according to claim 8, in which said further bore for said third photocell is an axial bore in said support member and the pertaining said hole leading therefrom substantially at right angles to the axis thereof near the outer end of said support member, said third photocell being positioned in said further bore in a region remote from the said hole, a reflector element at the juncture of said further bore and its said hole to direct radiation entering said hole toward said third photocell.

10. A device according to claim 9, in which said body is filled with a potting material to impart strength and weight thereto.

11. A device according to claim 1, in which said second photocell is connected in circuit with said first photocell so as to subtract the signal from said second photocell from that of said first photocell.

12. A device according to claim 2, in which said second photocell is connected in circuit with said first photocell so as to subtract the signal from said second photocell from that of said first photocell, and said third photocell is connected in circuit with said first and second photocells so that the signal from said third photocell divides the difference between the signals from said first and second photocells.

13. A device according to claim 1, in which said radiation is infrared radiation.

14. A device according to claim 1, in which said radiation is visible light.

PO-1050
(5/69)

UNITED STATES PATENT OFFICE
CERTIFICATE OF CORRECTION

Patent No. 3,586,862　　　　　　　　Dated June 22, 1971

Inventor(s) George J. Topol

It is certified that error appears in the above-identified patent and that said Letters Patent are hereby corrected as shown below:

Col. 4, line 39, "37" should be --- 36 ---.

Col. 6, lines 30 and 31, the words "receiving said third photocell, holes in said support member" should be deleted.

Signed and sealed this 9th day of November 1971.

(SEAL)
Attest:

EDWARD M. FLETCHER, JR.　　　ROBERT GOTTSCHALK
Attesting Officer　　　　　　Acting Commissioner of Patents